US008935605B2

(12) United States Patent
Matsa et al.

(10) Patent No.: US 8,935,605 B2
(45) Date of Patent: Jan. 13, 2015

(54) VALIDATOR-DRIVEN ARCHITECTURE OF AN XML PARSING AND VALIDATING SOLUTION

(75) Inventors: Moshe E. Matsa, Cambridge, MA (US); Eric Perkins, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 1616 days.

(21) Appl. No.: 12/130,285

(22) Filed: May 30, 2008

(65) Prior Publication Data

US 2008/0229292 A1   Sep. 18, 2008

Related U.S. Application Data

(63) Continuation of application No. 11/460,050, filed on Jul. 26, 2006.

(51) Int. Cl.
*G06F 3/00* (2006.01)
*G06F 17/27* (2006.01)

(52) U.S. Cl.
CPC .................................. *G06F 17/2725* (2013.01)
USPC ........................................................ 715/237

(58) Field of Classification Search
USPC .................................. 715/234, 243, 254, 237
See application file for complete search history.

(56) References Cited

U.S. PATENT DOCUMENTS

2006/0074838 A1*  4/2006  Srivastava .......................... 707/1
2006/0212859 A1   9/2006  Parker et al.
2007/0250766 A1  10/2007  Medi et al.

OTHER PUBLICATIONS

Kenneth Chiu and Wei Lu "A Compiler-Based Approach to Schema-Specific XML Parsing", Indiana University, May 2005. wam.inrialpes.fr/www-workshop2004/ChiuLu.pdf.
IBM Systems Journal, vol. 45, No. 2, 2006, "Generation of efficient parsers through direct compilation of XML Schema grammars," E. Perkins, M. Matsa, M.G. Kostoulas, A. Heifets, and N. Mendelsohn. pp. 1-20.

* cited by examiner

*Primary Examiner* — Kyle Stork
(74) *Attorney, Agent, or Firm* — Cantor Colburn LLP; Nidhi Garg

(57) ABSTRACT

A method for parsing a document in an Extensible Markup Language (XML) format includes identifying data via the XML format, defining a tag set including a plurality of tags, defining a tokenizer that produces one token at a time, parsing the XML document via a parser, validating the XML document via a validation engine, the validation engine driving the tokenizer, the validating being an integral part of the parsing, and permitting the validation engine to be written in a recursive-descent code-driven manner.

15 Claims, 6 Drawing Sheets

VALIDATOR-DRIVEN ARCHITECTURE OF AN XML PARSING AND VALIDATING SOLUTION

CROSS-REFERENCE TO RELATED APPLICATION

This application is a continuation of U.S. patent application Ser. No. 11/460,050, filed Jul. 26, 2006. The disclosure of the above application is incorporated herein by reference.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to XML parsers, and particularly to a method that treats validation engines as an integral part of parsing by allowing the validation engines to be written in a recursive-descent code-driven manner.

2. Description of Background

XML (Extensible Markup Language) has begun to work its way into the business computing infrastructure and underlying protocols such as the Simple Object Access Protocol (SOAP) and Web services. In the performance-critical setting of business computing, however, the flexibility of XML becomes a liability due to the potentially significant performance penalty. XML processing is conceptually a multitiered task, an attribute it inherits from the multiple layers of specifications that govern its use including: XML, XML namespaces, XML Information Set (Infoset), and XML Schema. Traditional XML processor implementations reflect these specification layers directly. Bytes, read off the "wire" or from disk, are converted to some known form. Attribute values and end-of-line sequences are normalized. Namespace declarations and prefixes are resolved, and the tokens are then transformed into some representation of the document Infoset. The Infoset is optionally checked against an XML Schema grammar (XML schema, schema) for validity and rendered to the user through some interface, such as Simple API for XML (SAX) or Document Object Model (DOM) (API stands for application programming interface).

With the widespread adoption of SOAP and Web services, XML-based processing, and parsing of XML documents in particular, is becoming a performance-critical aspect of business computing. In such scenarios, XML is invariably constrained by XML parsing and validation by having the tokenizer drive the validation engine. In fact, most tokenizers parse the entire XML document by performing tokenizing with a DOM or SAX event stream and then run the validation engine over the stream of tokens or the DOM. However, technologies that treat validation as an integral part of parsing have not reached their full potential. Regardless of which manner of pushing the tokens is used, none of the current technologies allow the validation engine to be written in a recursive-descent code driven manner. As a result, this requires large tables, which increase the memory footprint, thus slowing processing efficiency. It also makes the validation code slower, and obscures the control flow of the whole parsing and validation processes.

Thus, it is well known that there are no existing technologies that treat validation as an integral part of parsing. Therefore, it is desired to integrate validation and parsing, and enable the writing of the validation engine in a recursive-descent code-driven manner.

SUMMARY OF THE INVENTION

The shortcomings of the prior art are overcome and additional advantages are provided through the provision of a method for parsing a document, the document being in an Extensible Markup Language (XML) format, the method comprising: identifying data via the XML format; defining a tag set including a plurality of tags; defining a tokenizer that produces one token at a time; parsing the XML document via a parser; validating the XML document via a validation engine, the validation engine driving the tokenizer, and the validating being an integral part of the parsing; and permitting the validation engine to be written in a recursive-descent code-driven manner.

The shortcomings of the prior art are overcome and additional advantages are provided through the provision of a system for parsing a document, the document being in an Extensible Markup Language (XML) format, the system comprising: a network; and a host system in communication with the network, the host system including XML software to implement a method comprising: identifying data via the XML format; defining a tag set including a plurality of tags; defining a tokenizer that produces one token at a time; parsing the XML document via a parser; validating the XML document via a validation engine, the validation engine driving the tokenizer, and the validating being an integral part of the parsing; and permitting the validation engine to be written in a recursive-descent code-driven manner.

The shortcomings of the prior art are overcome and additional advantages are provided through the provision of a computer program for parsing a document, the document being in an Extensible Markup Language (XML) format, the computer program product comprising: a storage medium readable by a processing circuit and storing instructions for execution by the processing circuit for performing a method comprising: identifying data via the XML format; defining a tag set including a plurality of tags; defining a tokenizer that produces one token at a time; parsing the XML document via a parser; validating the XML document via a validation engine, the validation engine driving the tokenizer, and the validating being an integral part of the parsing; and permitting the validation engine to be written in a recursive-descent code-driven manner.

Additional features and advantages are realized through the techniques of the present invention. Other embodiments and aspects of the invention are described in detail herein and are considered a part of the claimed invention. For a better understanding of the invention with advantages and features, refer to the description and the drawings.

TECHNICAL EFFECTS

As a result of the summarized invention, technically we have achieved a solution that integrates validation and parsing, thus resulting in a faster and more efficient validating parser, without large tables, and with a clear control flow through the entire parsing and validating processes.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
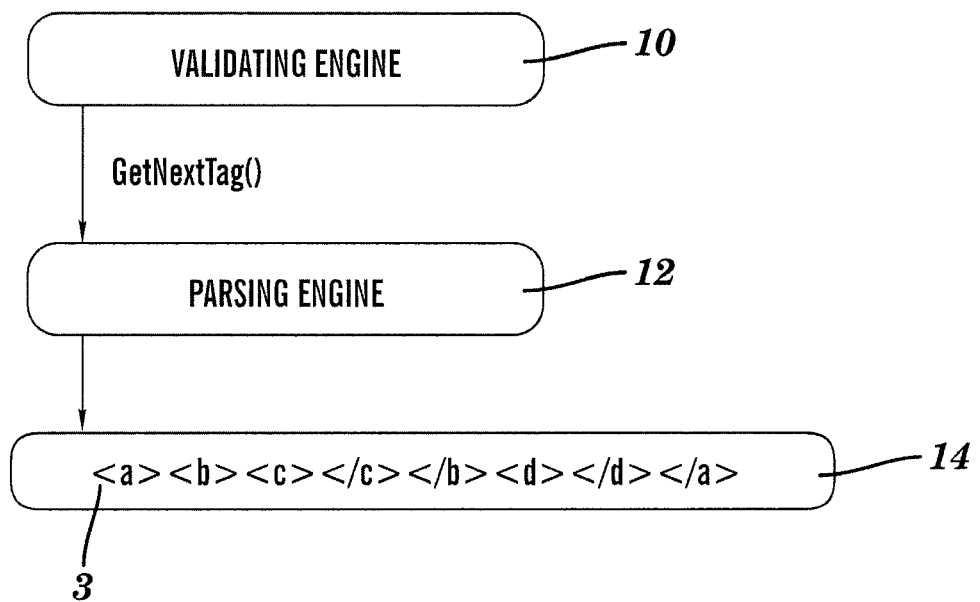
FIG. 1 illustrates one example of a diagram showing a validating engine communicating with a parser in order to receive a start tag.

One aspect of the exemplary embodiments is a method for integrating validation and parsing processes. Another aspect of the exemplary embodiments is a method for allowing a validation engine to be written in a recursive-descent code-driven manner.

A recursive descent parser is a top-down parser built from a set of mutually-recursive procedures (or a non-recursive equivalent) where each such procedure usually implements one of the production rules of the grammar. Thus the structure of the resulting program closely mirrors that of the grammar it recognizes. Code-driven refers to the design style that is common in some handcrafted programs. In general, there are three styles of code in generated programs. In a program-generation system, the need for understanding and change occurs at the specification level, not the program level. This results in greater flexibility in the design of generated programs. Three styles of generated programs are known. The OO (Object Oriented) approach favors highly structured OO techniques. The code-driven approach favors straightforward code with embedded data. The table-driven approach puts data in a separate data section that is used by the code section. A typical program generator will use some combination of these three techniques. In the exemplary embodiments, a generated code is preferred, which is generated from the DTD or other grammar information for the XML dialect. From the generated code an XML parser that is code-driven or table-driven may be generated. In most cases, most of the code for the parser is static and unchanging, but tables are generated from the DTD. In other words, these current solutions are table-driven because that is the only viable approach. The exemplary embodiments of the present invention allow for a code-driven approach.

Once a class of XML documents is defined, there is a need for a method of navigating through the XML documents. XML cursors are a way to navigate through an XML instance document. Once a user loads an XML document, the user may create a cursor to represent a specific place in the XML document. Because a user may utilize a cursor with or without a schema corresponding to the XML document, cursors are an ideal way to handle XML documents without the schema. With the XML cursor, the user may utilize a token model to move through the XML document in small increments, or in a manner similar to using a DOM-based model.

In the exemplary embodiments of the present application, the validator-driven architecture has a validation engine drive the tokenizer and the tokenizer produces one token at a time, as needed by the validation engine. This enables the validation engine to be written in a recursive-descent code-driven manner. This results in a faster validating parser, without large tables, and with a clear control flow through the whole parsing and validation process. This makes the validation code easier to write, test, maintain, and extend, as well as making the code shorter and faster.

Below is one example of an algorithm containing the validation code written in a recursive-descent code-driven manner. In particular, at any given point in the parse, the parsing engine maintains a pointer in the XML buffer, as well as other states, as appropriate. The validating engine maintains control of the parse, and engages the parsing engine when it requires a next piece of information from the XML instance document, using for example a call function GetNextTag( ). Consider the following DTD fragment:

```
<!ELEMENT a (b,d)>
<!ELEMENT b (c)>
```

In this case, the validation code could be written in a recursive-descent code-driven manner, as indicated by this pseudo-code:

```
validate-top-level-tag {
    tag = GetNextTag( );
    if(tag == "a")
        validate-a( );
    else if(tag == "b")
        validate-b( );
    else
        error("illegal top-level tag");
}
validate-a {
    if(GetNextTag( ) == "b")
        validate-b( );
    else
        error("a should start with a b");
    if(GetNextTag( ) == "d")
        validate-d( );
    else
        error("a should continue with a d");
    if(GetNextTag( ) == "/a")
        return
    else
        error("a should end with a /a");
}
validate-b {
    if(GetNextTag( ) == "c")
        validate-c( );
    else
        error("b should start with a c");
    if(GetNextTag( ) == "/b")
        return
    else
        error("b should end with a /b");
}
```

FIGS. 1-4 illustrate one example of a process diagram showing a validating engine communicating with the parser in order to receive one or more start tags.

FIG. 1 illustrates a validating engine 10 communicating with a parsing engine 12. The parsing engine 12 receives one or more tags from an input buffer 14. In FIG. 1, the process starts in a routine at the top and the validating engine 10 requests a tag (i.e., <a> tag 3) from the parsing engine 12.

Figure 2:
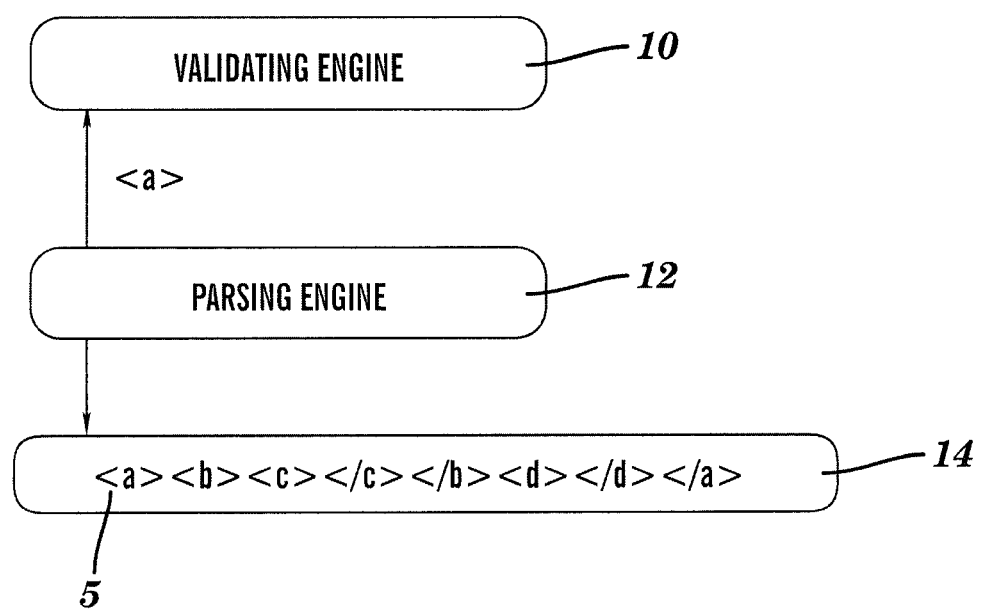
FIG. 2 illustrates one example of a diagram showing the parser communicating with the validating engine in order to send the start tag.

In FIG. 2, the parsing engine 12 has updated its state, including moving the pointer ahead, beyond the <a> tag 3, to the next spot 5 in an input buffer 14.

Figure 3:
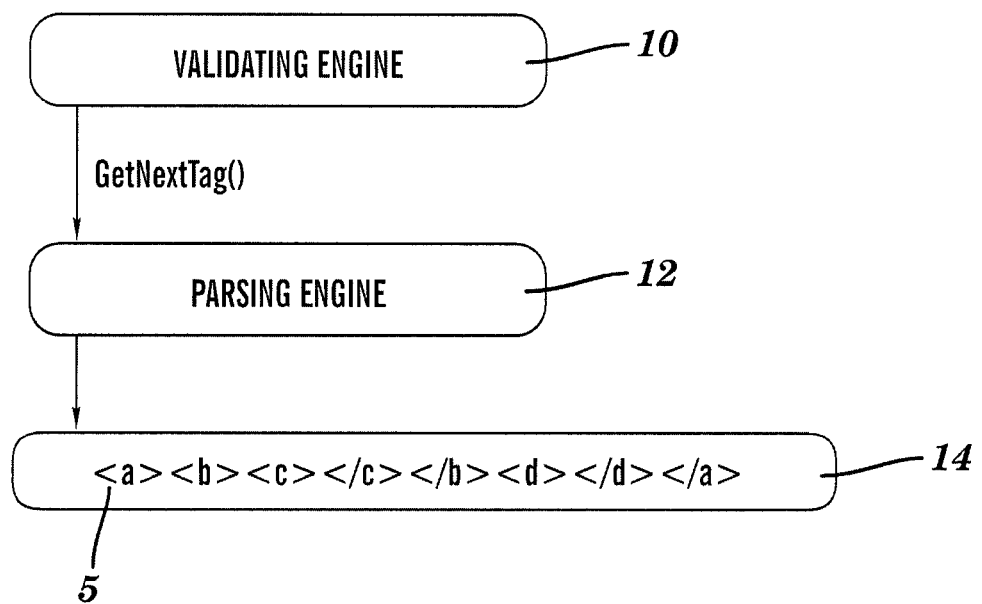
FIG. 3 illustrates one example of a diagram showing the validation code calling a function GetNextTag( )

In FIG. 3, the validating engine 10 receives the <a> tag 3 and the validation code proceeds by calling a "validate-a" routine, whose first action is to re-call the function GetNextTag( ).

Figure 4:
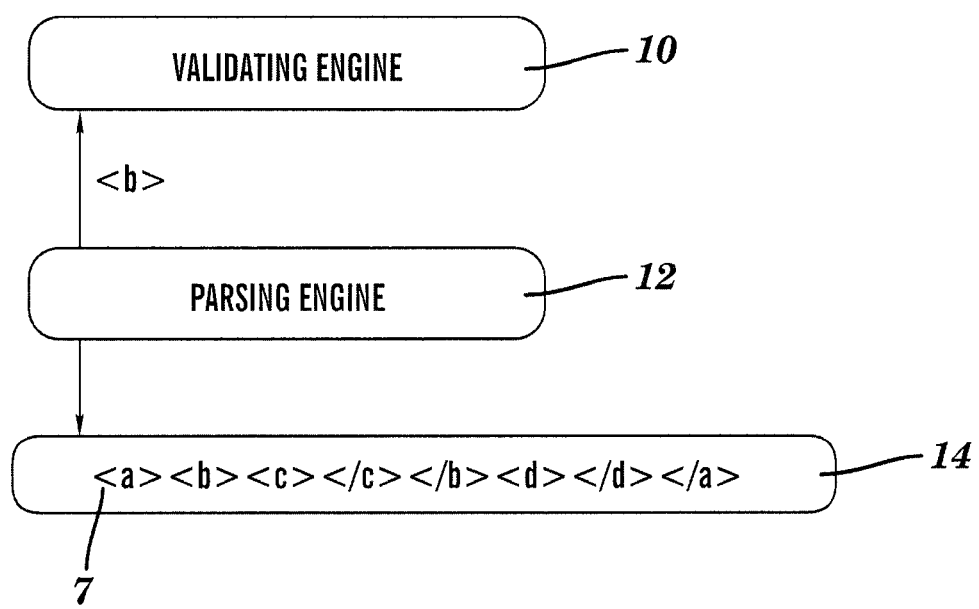
FIG. 4 illustrates one example of a diagram showing the parser transferring control back to the validating engine.

In FIG. 4, the parsing engine 12 decides to return the <b> tag 5 it received from the input buffer 14. Finally, the parsing engine 12 transfers control back to the validating engine 10, deciding that when asked it will continue the parse where its state indicates that it left off, namely at the next spot 7.

Processing continues in this manner until the validating engine 10 completes a path through the entire XML document. The validation code is very straightforwardly an implementation of this particular DTD fragment, and thus the validation code could be written in a generic manner to process any DTD, and validate the XML instance document against it.

Figure 5:
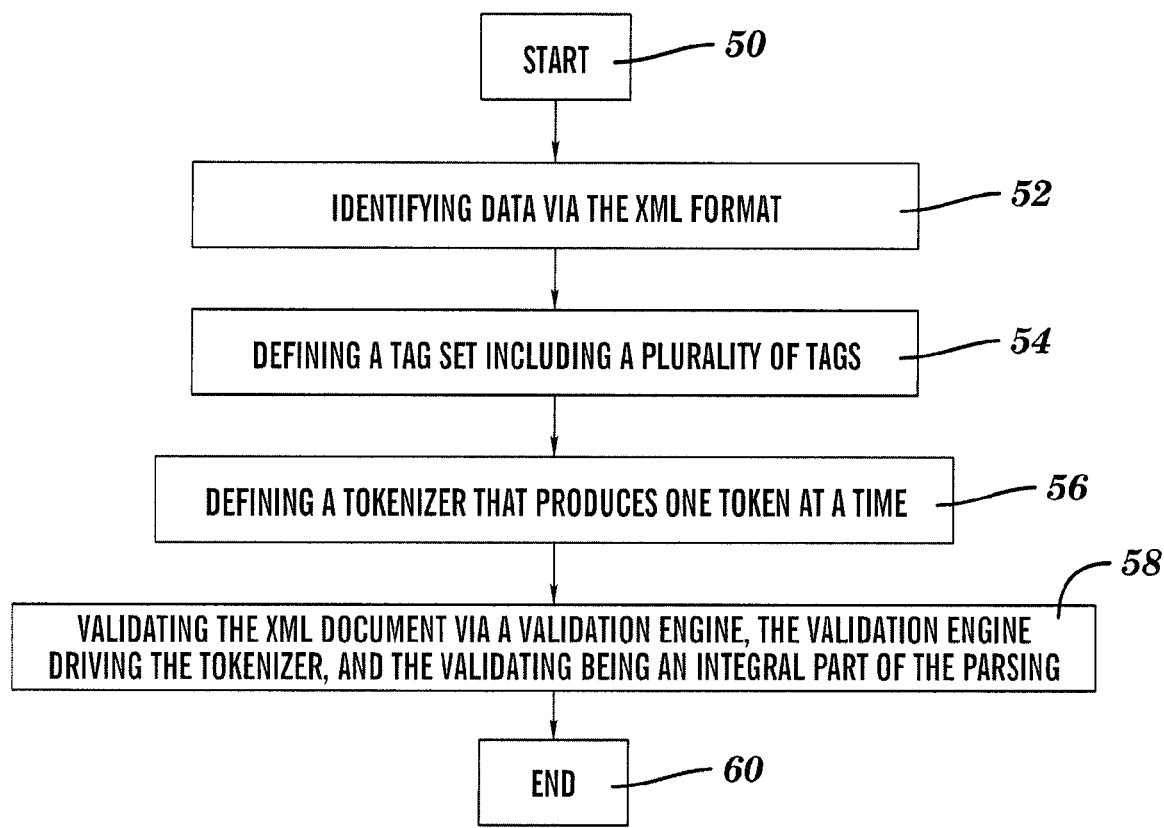
FIG. 5 illustrates one example of a method for parsing and validating a document in a XML (Extensible Markup Language) format.

Referring to FIG. 5, a method for parsing a document in a XML format is shown. The parsing process commences at step 50 when a user commences a document parsing operation. At step 52 the data is identified to determine whether it is XML format data. At step 54 a tag set is defined that includes a plurality of tags. At step 56 a tokenizer that produces one token at a time is defined. At step 58 the XML document is validated via a validation engine, the validation engine driving the tokenizer, and the validating being an integral part of the parsing. At step 60 the parsing process terminates.

Figure 6:
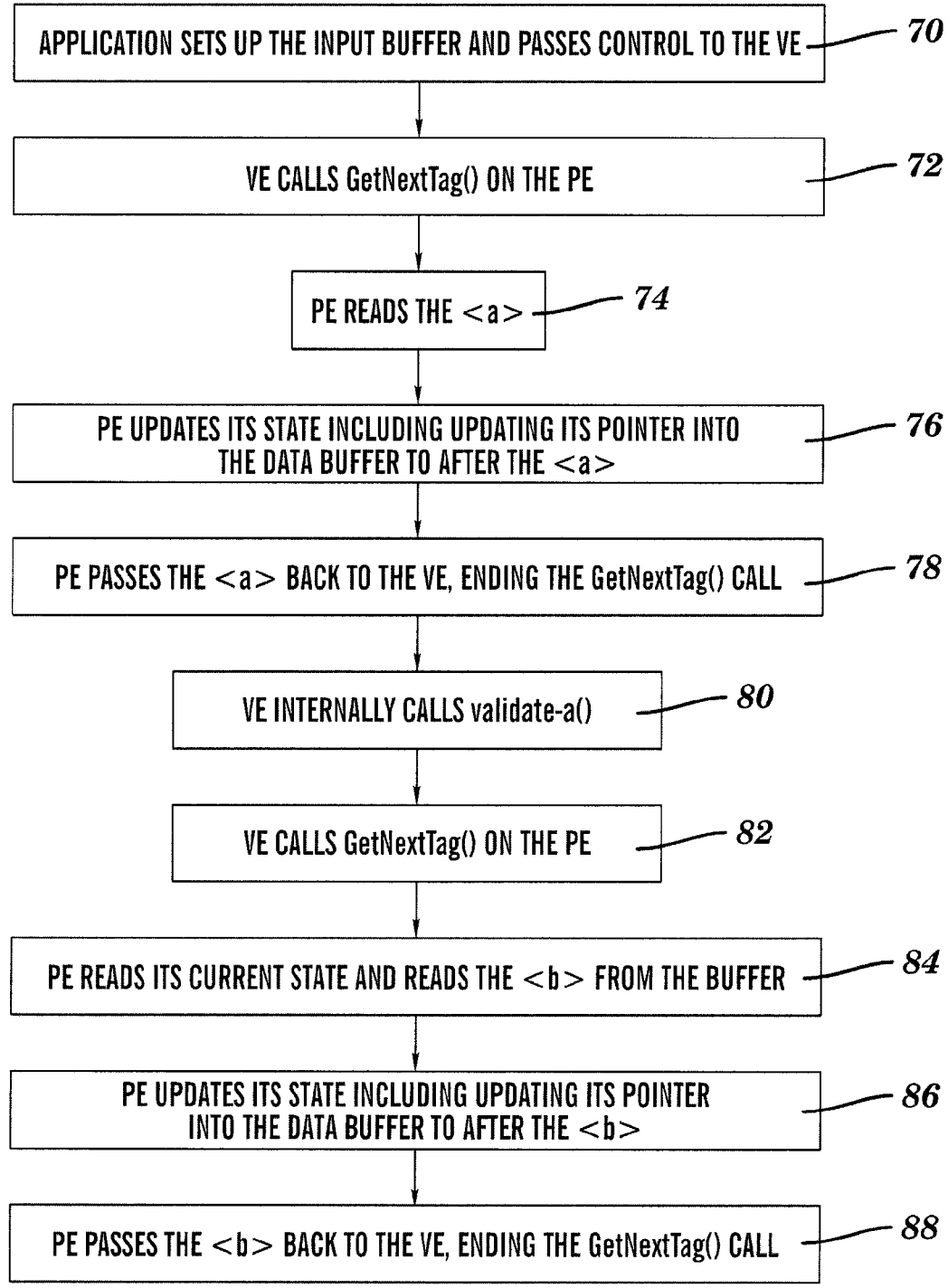
FIG. 6 illustrates one example of a communication between a validating engine and a parsing engine.

Referring to FIG. 6, a communication between a validating engine and a parsing engine is shown. At step 70, the method sets up the input buffer and passes control to the VE (validating engine). At step 72, the VE calls GetNextTag( ) on the PE (parsing engine). At step 74, the PE reads the <a> tag. At step 76, the PE updates its state including updating its pointer into the data buffer to after the <a> tag. At step 78, the PE passes the <a> tag back to the VE, ending the GetNextTag( ) call. At step 80, the VE internally calls validate-a( ). At step 82, the VE calls GetNextTag( ) on the PE. At step 84, the PE reads its current state and reads the <b> tag from the buffer. At step 86, the PE updates its state including updating its pointer into the data buffer to after the <b> tag. At step 88, the PE passes the <b> tag back to the VE, ending the GetNextTag( ) call.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for parsing a document, the document being in an Extensible Markup Language (XML) format, the method comprising:
    parsing the XML document via a parser;
    validating the XML document via a validation engine operating on a computer, the validation engine driving a tokenizer to produce one token at a time from the XML document, the driving being based on a recursive-decent and code driven method, and the validating being an integral part of the parsing.

2. The method of claim 1, wherein the parser maintains one or more datatypes in a buffer.

3. The method of claim 1, wherein the validation engine maintains control of the parser.

4. The method of claim 1, wherein the validation engine activates the parser when the validation engine requires a next piece of information from the XML document.

5. The method of claim 4, wherein the next piece of information is retrieved via a function GetNextTag( ).

6. A system for parsing a document, the document being in an Extensible Markup Language (XML) format, the system comprising:
    a network; and
    a host system in communication with the network, the host system including XML software to implement a method comprising:
    parsing the XML document via a parser;
    validating the XML document via a validation engine operating on a computer, the validation engine driving a tokenizer to produce one token at a time from the XML document, the driving being based on a recursive-decent and code driven method, and the validating being an integral part of the parsing.

7. The system of claim 6, wherein the parser maintains one or more datatypes in a buffer.

8. The system of claim 6, wherein the validation engine maintains control of the parser.

9. The system of claim 6, wherein the validation engine activates the parser when the validation engine requires a next piece of information from the XML document.

10. The system of claim 9, wherein the next piece of information is retrieved via a function GetNextTag( ).

11. A computer program product for parsing a document, the document being in an Extensible Markup Language (XML) format, the computer program product comprising:
    a non-transitory storage medium readable by a processing circuit and storing instructions for execution by the processing circuit for performing a method comprising:
    parsing the XML document via a parser;
    validating the XML document via a validation engine operating on a computer, the validation engine driving a tokenizer to produce one token at a time from the XML document, the driving being based on a recursive-decent and code driven method, and the validating being an integral part of the parsing.

12. The computer program product of claim 11, wherein the parser maintains one or more datatypes in a buffer.

13. The computer program product of claim 11, wherein the validation engine maintains control of the parser.

14. The computer program product of claim 11, wherein the validation engine activates the parser when the validation engine requires a next piece of information from the XML document.

15. The computer program product of claim 14, wherein the next piece of information is retrieved via a function GetNextTag( ).

\* \* \* \* \*